April 24, 1945.   W. N. WHITE   2,374,401
AIR PILOT INSTRUCTION SYSTEM
Filed May 24, 1943   4 Sheets-Sheet 1
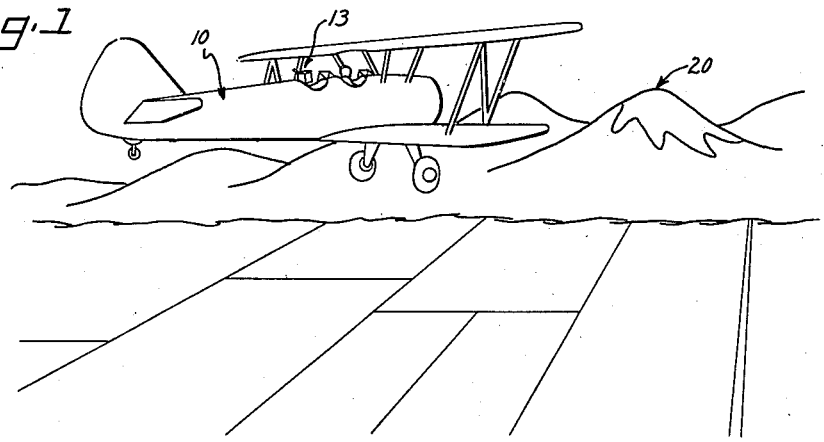
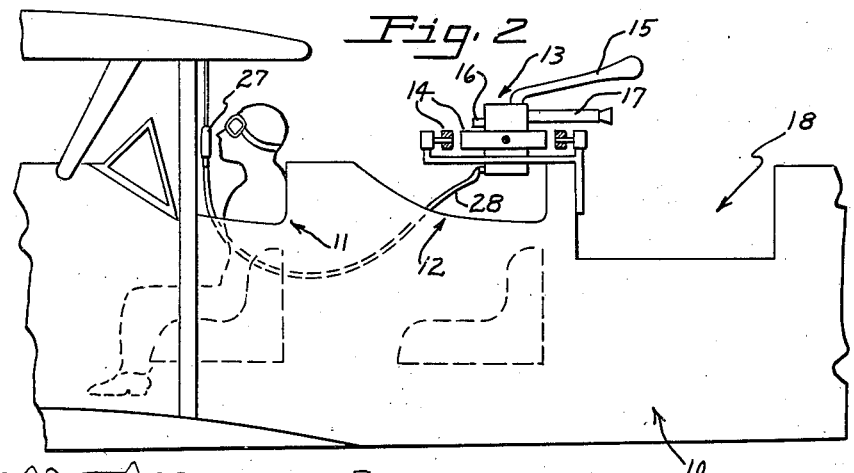
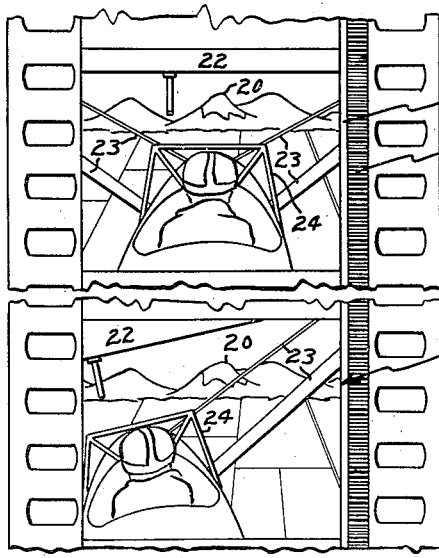
Inventor
William N. White
Attys.

April 24, 1945.   W. N. WHITE   2,374,401
AIR PILOT INSTRUCTION SYSTEM
Filed May 24, 1943    4 Sheets-Sheet 2

Inventor
William N. White
By Barclay & Seabury
Attys.

April 24, 1945. W. N. WHITE 2,374,401
AIR PILOT INSTRUCTION SYSTEM
Filed May 24, 1943 4 Sheets-Sheet 3

Inventor
William N. White
Attys.

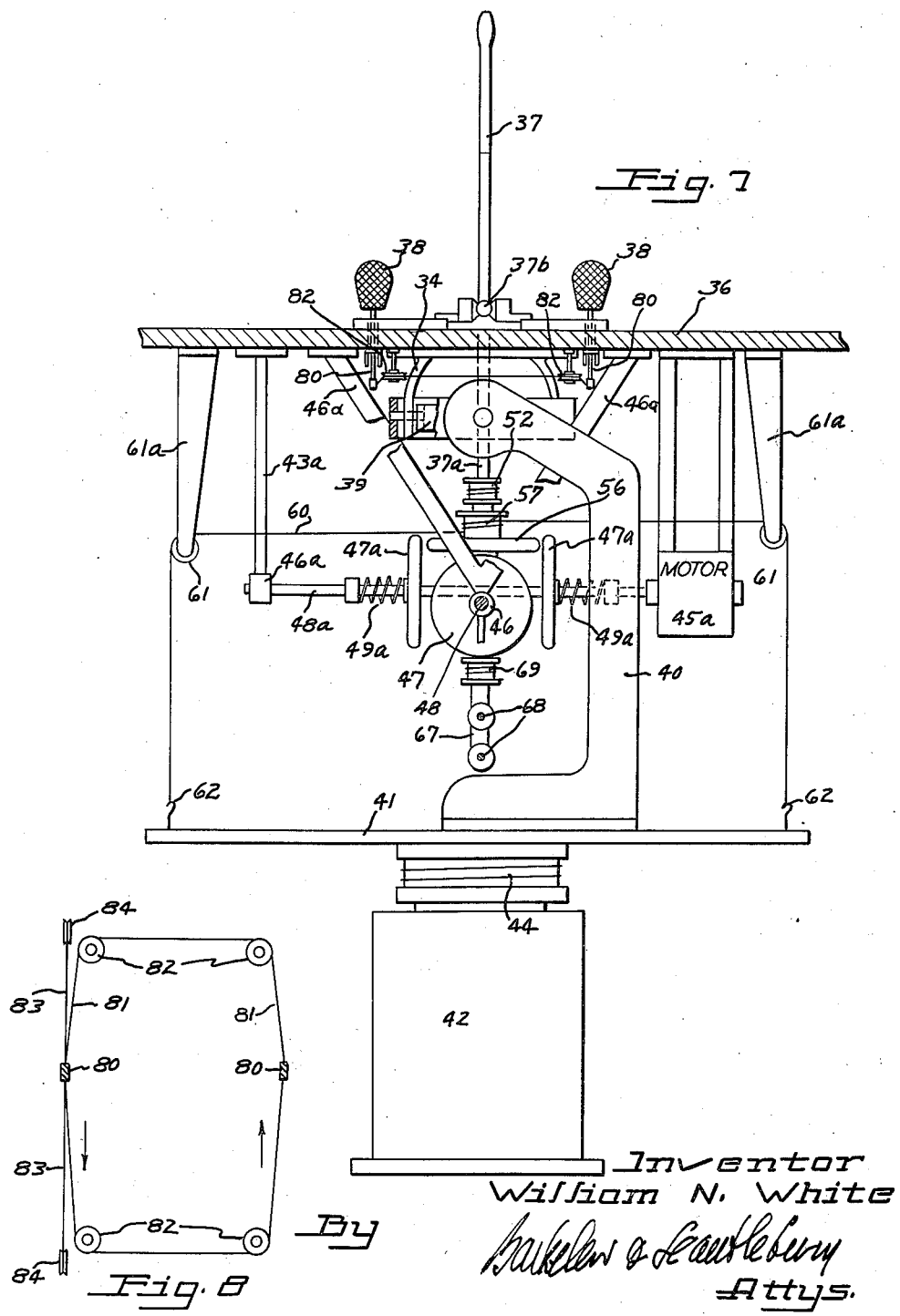

Patented Apr. 24, 1945

2,374,401

UNITED STATES PATENT OFFICE 2,374,401

AIR PILOT INSTRUCTION SYSTEM

William N. White, Ontario, Calif.

Application May 24, 1943, Serial No. 488,160

1 Claim. (Cl. 35—12)

Many attempts have been made in the past to provide systems of ground instruction for air pilots, but as far as I am aware no system which has previously been used or proposed has been altogether satisfactory, for various reasons.

The general objective of any such system is to teach primary students the more important and fundamental elements of flying, on the ground where hazards for both the student and plane are eliminated. It is desirable to use ground instruction for instruction in fundamentals preliminary to soloing and also as supplementary instruction, for time saving as well as elimination of hazards when weather conditions or other causes preclude instruction in the air.

Various attempts have been made in the past to provide a satisfactory system of ground instruction, but all of the previously proposed systems of which I am aware have failed of their ultimate and desired purposes largely because of inherent lack of realism for the student. For instance, it has previously been proposed to take a series of motion pictures, from a plane actually in flight, in a camera which is fixed or substantially fixed with reference to the plane; and then to project those pictures on a screen or screens before or surrounding the student who is seated in a dummy pilot's seat with simulated controls at hand. The primary shortcoming of such systems resides in the fact that, although the student may have some of the sensation of the air scene (horizon, etc.) moving before him, he still has nothing in the demonstration picture which forms any guide indicating to him what he is expected to do under the conditions which are being pictured before him.

It is a characteristic of my present invention that it provides for the grounded student a realistic pictorial representation of the maneuvers which he is expected to perform under the various and particular conditions he may meet in flying, and which he must learn to perform in order to learn the various maneuvers which are essential as preliminary to further instruction and practice in the art, or are useful as supplements to actual air instruction and practice. The general characteristics of my system, by which I accomplish these stated purposes and other desirable purposes, are now briefly explained.

I first take a motion picture from an aircraft going through the action or maneuver which is to be taught to the student. This picture is taken, except for certain particular and especial purposes which will be referred to hereinafter, in a camera which is kept trained during the entire maneuver on some chosen point in the view. The picture is taken from a view point in the plane such that the picture shows what may be called a pilot's eye view; and, typically, the finished picture shows a relatively stationary ground or air scene, and shows the forward parts of the aircraft moving in the performance of the selected maneuver. The distinctive feature of the invention, at this point in the series of operations, is that in the finished picture the general scene which is external of the aircraft remains relatively stationary while the aircraft is shown as going through the various movements which are required for the successful and proper performance of the selected maneuver.

These pictures may be made in various manners. For instance, in a simple set-up, an ordinary motion picture camera may be mounted in the aircraft in such a position that its viewpoint is the same as the viewpoint of a student pilot. While an experienced instructor takes the plane through the chosen maneuver, a photographic assistant may manipulate the camera (suitably mounted and balanced) so as to keep it angularly stationary with reference to surrounding space and to keep it trained on some fixed point in the view—say on a fixed point on the horizon. For manual operation, the camera may be so mounted, balanced and weighted, that it tends to maintain a stationary alinement and can be kept in that alinement by the photographer without great effort. On the other hand the camera may be so mounted and controlled as to be automatically held in stationary alinement, as by a gyroscopic mount. Further, instead of using an ordinary simple motion picture camera which takes a single motion picture, I may utilize a battery of motion picture cameras which are kept constantly alined at different horizontal or vertical angles with relation to each other. And in the final projection of such multiple pictures, they may be projected along optical axes corresponding to those at which the original pictures were taken, and projected onto screens which to a greater or lesser extent surround the student and thus give him a more or less complete panorama of the whole of the scene which would surround him in actual flight. Or, instead of a multiplicity of cameras, a panoramic camera, or a multiple camera mechanism which is designed and adapted to take multiple pictures at relatively fixed angles, may be used. In other words, any kind of motion picture camera, single or multiple, panoramic, or stereoscopic (to obtain stereoscopic pictures for stereoscopic projection) may be used. However, for the purpose of explaining my present invention, it will be sufficient to describe in detail the taking of such pictures with a single camera, as the invention which I am here disclosing is not to be limited either to an ordinary single motion picture, or to a panoramic picture, or to a multiplicity of pictures which make up a panorama.

Another matter may also be mentioned in connection with the originally taken pictures. Although I describe those pictures as being actually taken from a pilot's position in a plane in the air, and although the pictures will, as I apprehend, ordinarily be taken in that manner, it is sufficient that the pictures appear as if they were taken in that manner and it is consequently possible to make simulative pictures for my process by special effects or trick means and systems which are well known to motion picture technicians.

The pictured result of any such motion picture is a moving picture in which some selected reference point (or a selected series of different reference points), such as reference points on the horizon or on the landing field, remain stationary in the picture. And in the picture the image of some one or more reference points on the plane move in accordance with the maneuver being performed. That is, the image of the forward part of the plane, constituting the aircraft reference points, move with relation to a relatively stationary background. There are some special teaching operations in which the picture will be made in such a manner that the image of the plane remains stationary while the image of the background (for instance the image of the landing field) shifts in the picture. Such special operations will be explained later.

Having obtained the proper pictures, the student is seated in a dummy plane which is, in certain essential respects, a replica of the plane from which the original pictures were taken, or simulatively taken. The dummy replica is so designed that the student, seated in his student's pilot seat, will have before him the necessary reference points on his dummy plane, coinciding in angular position or positions to the position or positions of the original reference points on the original plane. The physical nature of the reference points is of no particular importance, so long as they are readily distinguishable to the student. Neither is the actual dimensional size of the dummy plane of any particular importance. Thus, for instance the dummy may be an actual full sized plane which duplicates the plane from which the pictures were taken, or it may be a reduced scale model of that plane, or it may be a replica of only the forward parts of the plane at any suitable scale. And, in practice, although only two angularly spaced definite reference points in the field of view of the picture and of the student are necessary, it may be preferable to utilize as reference points the whole of the aircraft structure which is in that field of view.

Whatever structure is used as reference points, the student seated in the dummy plane will have those reference points in his field of vision in the same angular relations as they are or would be to him in the actual aircraft. The previously taken pictures are projected upon a screen or screens in such relation to the student, and at such size, that the image of the original aircraft appears to the student in the same angular size as it would appear to him in reality, and therefore at the same angular size as his dummy plane appears to him. The dummy plane being maneuverable by the student with a set of controls which are preferably duplicates of those in the original aircraft, he can then maneuver his dummy plane to keep his reference points lined up with the reference points in the picture; and by so doing he will be moving his dummy plane on its three axes with reference to space in exactly the same manner as the original plane has moved about its three axes with reference to space in the correct performance of the selected maneuver.

The student may thus effectively learn, on the ground, the movements through which he must put his plane in order to perform the various maneuvers which he must learn. And he does all that in a realistic pictorial atmosphere. He has a sensation of being in the pictured cock-pit in the air. Other effects may be added to heighten the realism, such as sound effects to simulate sound of motor and air current, and wind effects to simulate the actual air current. These sound effects may be independently produced, or reproduced from a sound track on the picture film. And, in addition, the sound track of the picture film may also carry comments and instructions which have been recorded by the instructor at the time when he originally performed the maneuver in the air and the pictures were being taken. For instance, the instructor may announce preliminarily the maneuver which he is about to perform and give the student preliminary remarks or instruction which may be helpful. Then, as the manuver is originally performed by the instructor he may record for the student's subsequent benefit a continuing statement of the operations which the student should at the instant be performing in order to carry through the maneuver correctly.

The foregoing preliminary description of the invention has been based upon the assumption that the pictures will ordinarily show the selected maneuver as it should be performed. When the pictures are so made, the student's deviation from the pictured movements will indicate a measure of his lack of perfection. The student's deviation may be either noted by an instructor, or automatic means using photoelectric cells may be utilized for automatically indicating deviations. On the other hand, at least for especial and particular purposes, the original pictures may be taken in such a manner as to show the student certain mis-performances which he definitely should avoid; so as to teach the student to recognize the things he should not do as well as to recognize perfect performances.

For the purpose of describing typical instrumentation and operations, I now refer to the accompanying drawings in which Fig. 1 is a perspective showing the original instruction plane as it may appear while taking pictures over typical terrain;

Fig. 2 is a fragmentary side elevation indicating in diagram the mounting of the camera on the original plane;

Fig. 3 is a view illustrative of a typical motion picture made in the camera;

Fig. 7 is a view partially in elevation and partially in section as indicated by line 7—7 on Fig. 6; and Fig. 8 is a plan diagram of certain parts shown in Figs. 6 and 7.

Figure 4:
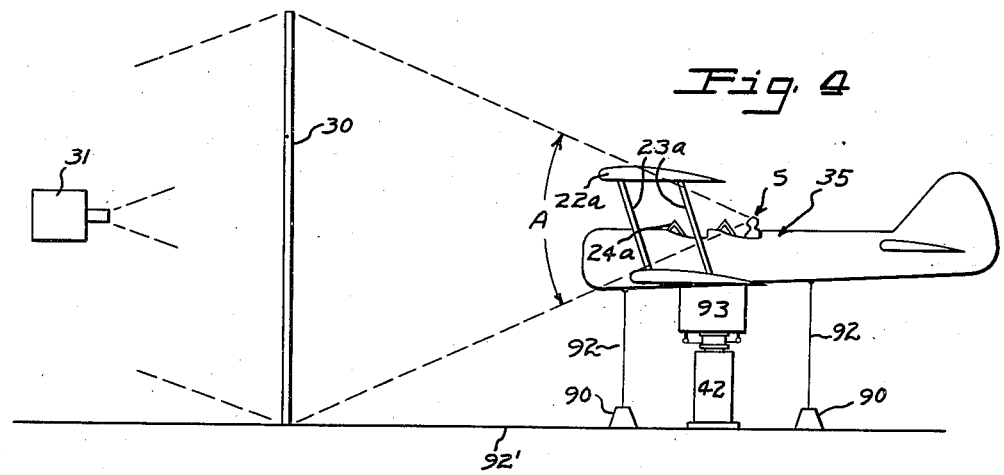
Fig. 4 is a diagrammatic elevation illustrative of a typical simple apparatus set-up in which the picture is projected before the student.

Referring first to Figs. 1, 2 and 3, a plane of the training type is shown at 10, with cockpits at 11 and 12 for instructor and student. A camera is shown at 13. Although, as I have indicated, the camera may be mounted and controlled in any suitable manner, I show it as being simply mounted on a set of gimbal rings 14 so as to be movable with reference to the plane about any of its three axes. The camera may be so mounted with reference to the gimbal rings as to be substantially balanced on its center of mass, and a handle, such as indicated at 15, may be provided for convenience of control by the photographic assistant. The camera lens tube is indicated at 16, located approximately in the position which would be occupied by the student's eyes if he were seated in cockpit 12; and the camera may be provided with the usual finder tube 17 to assist the photographer in maintaining the optical axis of the camera alined on some chosen point. The photographer, for instance, may occupy a position in the open baggage compartment 18 behind the camera while taking the pictures.

For the purpose of explaining typical operations in detail, I will assume that the instructor is about to put the plane 10 through a bank and turn, and that the camera is alined on the distant point indicated at 20 in Fig. 1. A typical resultant motion picture will then appear as indicated in Fig. 3. While the plane is in level straight flight toward the point indicated at 20, the picture will have a series of frames 21 in which the point 20 appears on the optical axis, and the distant hills and the ground below appear, as shown in Fig. 3, within the angle of view of the camera, which may be as wide as 60° or wider. For purposes of description I assume a horizontal angle of 60°. Within the angle of camera vision, certain parts of the forward portion of the plane will appear, including such elements as a portion of the upper wing 22, struts and braces 23 and the forward windshield 24. Then, as the plane goes into a bank and turn to the left with the camera still kept trained on the point 20, those parts of the plane will swing around to the left and into the proper corresponding banked position, as shown in a typical frame 25 of the motion picture. The external distant scene remains substantially stationary in all of the motion picture frames, as the camera has been kept alined on the point 20. It may be remarked that if the original performing plane levels out and continues on a new course after completing the turn, and the picture is continuously taken on the point 20, the nearer parts of the pictured background will of course move in the picture. However, for a picture length necessary to illustrate the complete bank and turn the distant scene will move little or none, and the foreground will also move little.

The motion picture film may have a sound track 26, and a microphone 27 may be so located that the pilot may speak into it and also so that it will pick up the noise which accompanies the flight of the plane. The camera 13 may have suitable sound recording apparatus. The connecting cable shown at 28 indicates that the microphone is connected with the recording apparatus of the camera. As has been indicated before, the pilot may record his appropriate observations, warnings and instructions which will afterwards be given to the student by reproduction from the film.

Figure 5:
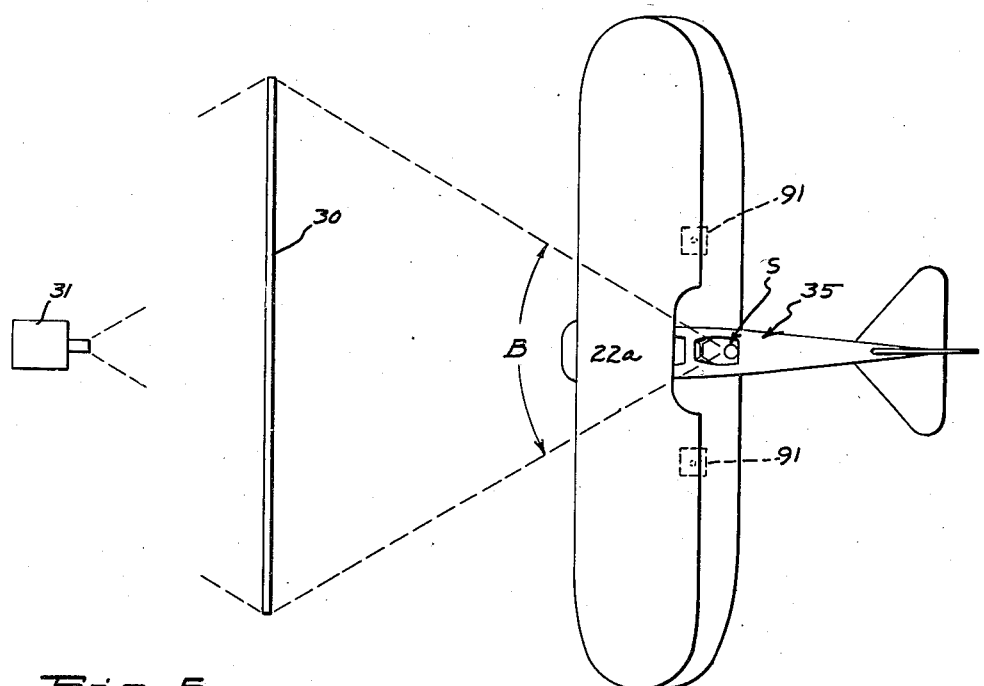
Fig. 5 is a diagrammatic plan of the same.

Figs. 4 and 5 show a typical simple arrangement wherein the previously prepared pictures are projected upon a screen before the student seated in the dummy aircraft. A screen is represented at 30 and a motion picture projector at 31. The projection may be either upon the forward face of the screen or may be from behind, using a translucent screen. The dummy aircraft, indicated generally by the numeral 35 is a replica of the original plane which appears in the motion pictures. As stated before, this replica may be to any suitable scale, it only being necessary that the angular visual spacing of those parts of the replica which form the reference points in the student's angle of vision be the same as the angular visual spacing of corresponding parts in the original plane. Thus, in Figs. 4 and 5 the vertical visual angle for the student at S is represented at A, and the horizontal visual angle is represented at B. These represented angles are the same as the corresponding field angles at which the motion pictures of Fig. 3 were taken. Within the visual angles A and B the student sees the several parts of his replica plane, such as the upper wing 22a, struts 23a and forward windshield 24a in the same relative angular positions as the corresponding parts appear in the pictures of the original plane. The pictures are then projected on screen 30 at such a size that each projected picture frame fills the screen 30 within the visual angles A and B. The result is that if the student places his replica plane in the proper position, the various parts of the replica within the visual angles A and B will exactly coincide in visual angle with the pictures of corresponding parts of the plane on the screen. The actual dimensional size to which the pictures are projectively enlarged depends upon several dimensional factors of the physical set-up, as will be readily understood. For instance, if the student's replica plane 35 is a full scale replica of the original, then the pictures are projected to a size greater than the size of the original plane, by a factor which depends upon the distance at which screen 30 is placed from the student. On the other hand, the projected dimensions need not be so large if screen 30 is placed closer and if replica 35 is constructed to a scale smaller than the original plane. But, whatever the scales may be, the arrangement is such that the relative angular positions of the several parts of the replica plane which form the student's reference marks, lie in the same relative visual angular relations as the corresponding parts in the original plane, and the location and size of the projected picture is such that the visual angular spacings of the corresponding picture parts are also the same. And thus, the student is able to manipulate his replica plane in such manner as to make its reference points or parts visually coincide with the corresponding parts of the pictured plane throughout the maneuvering movements of the latter, and the student easily obtains a realistic impression and feeling that his replica plane is identified with the pictured plane and is maneuvering in the surroundings and over the terrain which is pictured as background in the picture.

Any suitable mounting and arrangement of the dummy or replica plane may be adopted, just so long as it enables the student to move the replica plane about its three axes. Preferably the arrangement should include a set of controls which as far as practicable are duplicates of those in the original plane, and the action should be such as to give the student the same sensations and feel as he would obtain from the real controls. Although many different arrangements can be utilized, typical and illustrative arrangements are shown in Figs. 6, 7 and 8.

Figure 6:
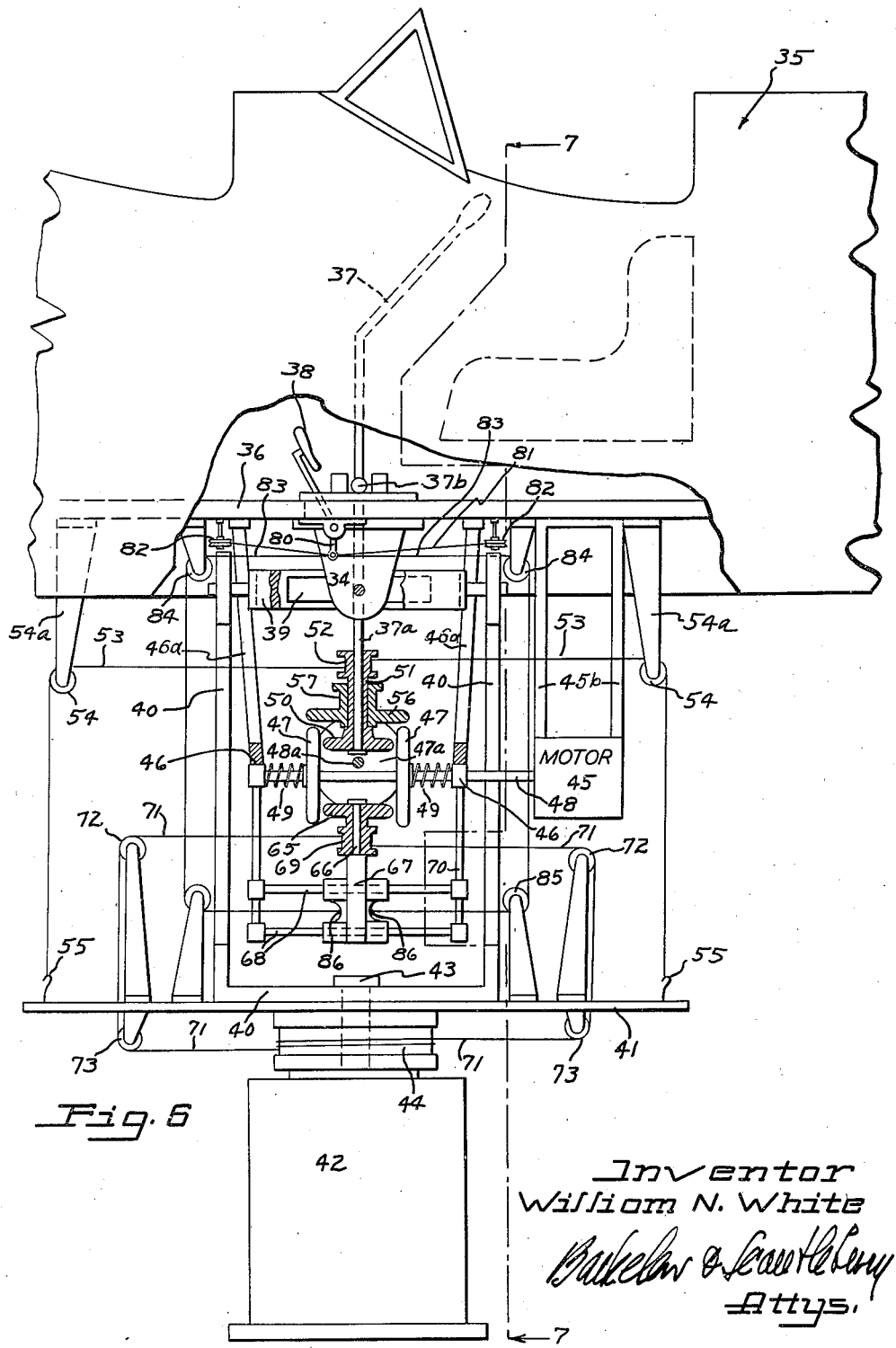
Fig. 6 is an enlarged, and more or less diagrammatic view, partly in section and partly in elevation, showing a typical suitable support and control mechanism for the student's dummy plane.

In Figs. 6 and 7 portions of the dummy replica are shown at 35, the floor of the replica being shown at 36. The controlling stick 37 and rudder pedals 38 are preferably duplicates of those in the original plane. The whole dummy is universally supported through brackets 34 on a suitable universal mount, such as the gimbal ring unit shown at 39, this gimbal unit being in turn supported on an upstanding yoke 40 which is mounted at its lower end on a turntable member 41. This turntable member is supported on a suitable pedestal 42 and mounted to turn about the vertical axis of a pivot stud or trunnion 43. The drum shown at 44 is stationary and turntable 41 rotates upon it.

A motor 45 is mounted in brackets 45b on the underside of floor 36 so as to move with the dummy. In operation, this motor constantly drives two friction disks 47 which are mounted on motor shaft 48 to rotate with that shaft but can slide along the shaft. Shaft 48 is mounted in bearings 46 which are framed as illustrated at 46a from the underside of floor 36. Springs 49 are arranged behind the two disks 47 to yieldingly hold them up to about the positions shown in Fig. 6. Motor shaft 48 lies on a horizontal axis longitudinally of the dummy.

Another similarly mounted motor 45a (see Fig. 7) drives another pair of friction disks 47a mounted on a horizontal cross shaft 48a; disks 47a being held up to the positions shown in Fig. 7 by springs 49a. Shaft 48a is supported by the motor bearings and by bearing 46a which is supported by bracket 43a from the underside of floor 36.

A downward extension 37a of stick 37 below its pivot 37b carries a friction wheel 50 which is adapted to be thrown into frictional engagement with either of the friction disks 47 as stick 37 is moved fore and aft. Friction wheel 50 is mounted on a sleeve 51 freely rotatable about the vertical axis of stick extension 37a, and the sleeve has a small sheave 52 at its upper end. Around sheave 52 a cable 53 is rove, the cable extending fore and aft from sheave 52, and then over idler sheaves 54 and down to be secured at its ends at 55 to turntable member 41. Sheaves 54 are supported from floor 36 by brackets 54a. With friction disks 47 being constantly driven, movement of stick 37 forwardly or rearwardly will frictionally engage wheel 50 with one or the other of the disks to drive wheel 50 selectively in opposite directions. Selective rotation of sheave 52 in opposite directions will cause a pull to be exerted on cable 53 selectively in opposite directions and will have the effect of tilting the dummy aircraft in a vertical plane to raise or lower its nose.

The lower extension 37a of the stick also carries another friction wheel 56 and a connected sheave 57 which are freely rotatable on the sleeve 51. Friction wheel 56 is located between the two friction disks 47a in such a manner that lateral shifting of stick 37 will throw wheel 56 into frictional engagement with either of the friction disks 47a. See Fig. 7. Friction wheel 56 is however at such an elevation that it will not contact the two friction disks 47. A cable 60 is rove about sheave 57 and extends laterally in opposite directions from the sheave and over idler sheaves 61 and thence downwardly with its ends secured at 62 to turntable 41. Sheaves 61 are supported from floor 36 by brackets 61a. With friction disks 47a in constant rotation, the lateral shifting of stick 37 will engage friction wheel 56 selectively with friction disks 47a to drive the friction wheel selectively in opposite directions and thus selectively to exert a pull on cable 60 in opposite directions and to tilt the dummy aircraft laterally in opposite directions.

Located below shaft 48 and between the two friction disks 47 there is another friction wheel 65 freely rotatable about a vertical axis 66 which is mounted on a slider 67 which is adapted to slide on longitudinal horizontal guide rods 68. Connected with friction wheel 65 and rotatable with it is a sheave 69. The horizontal guide 68 are framed in supports 70 which are structurally connected with the underside of floor 36, as for instance by being joined directly to the shaft bearings 46 which are framed from the underside of the floor.

An endless cable 71 is rove about sheave 69 and extends longitudinally in opposite directions from the sheave and then over idler sheaves 72, and downwardly and over idler sheaves 73 and thence to the drum 44 about which the cable is wound. Idler sheaves 72 and 73 are mounted on turntable 41. Shifting of friction wheel 65 fore and aft will engage it frictoinally with either of the friction disks 47, causing its rotation selectively in opposite directions to exert a pull in either of two oppostie directions on cable 71. Drum 44 being stationary, and turntable 41 being rotatable on it, the pull on cable 71 in either of the two opposite directions will cause the turntable, and the supported dummy plane, to be rotated in either of the two opposite directions about the vertical axis 43.

The fore and aft shifting of friction wheel 65 is effected by operation of rudder pedals 38. For instance, each pivoted rudder pedal 38 may have a lower extension 80. These two lower pedal extensions are shown diagrammatically in the diagram of Fig. 8, which is a diagram in a horizontal plane showing the cable rigging of the rudder pedals. The two lower pedal ends 80 may be interconnected by an endless cable 81 which runs over idler sheaves 82, mounted on floor 36; the cable thus interconnecting the pedal ends in such manner that they move oppositely to each other. To the lower end 80 of one of the pedals two cables 83 are connected. These two cables extend fore and aft in opposite directions and over idler sheaves 84 (which are supported from floor 36) thence downwardly and over idler sheaves 85 (mounted on turntable 41), and thence again longitudinally, and oppositely to be secured at 86 to slider 67. The arrangement is such that depression of one rudder pedal 38 will move slider 67 and friction wheel 65 forward while depression of the other rudder pedal will move them rearward, to selectively engage friction wheel 65 with either of the two friction disks 47. This selective engagement will cause selective rotation of friction wheel 65 and sheave 69 in opposite directions, to pull on cable 71 selectively in opposite directions and thus to turn the turntable and the whole supported structure in opposite directions about its vertical axis.

The forces which must be applied to stick 37 and rudder pedals 38 in order to cause the described operations may be readily made so as to simulate the forces which must be manually applied to the controls of an actual aircraft. Opposing weights, springs or drags may be applied as is desirable. For instance, the springs 49 and 49a exert forces which yieldingly oppose the controlling movements of stick 37. And righting forces may be applied to the whole movable dummy structure, to oppose its tilting and to right it when the manually controlled tilting forces are relieved. These righting forces may be of any suitable nature. For simplicity of disclosure, and as merely illustrative, I show two pairs of weights 90 and 91 hung from the underside of the dummy structure, in positions fore and aft, and laterally, of the center of support of the structure. These weights may, for instance, be hung on cables 92 at such heights that when the structure is in level position, as for level straight-forward flight, each of the four weights just touches the floor 92'. When the structure tilts over in any given direction, it will raise the weights at the high side, and they will then tend to right the structure.

In the simplified showing in Fig. 4 it is not attempted to indicate the details of the control mechanisms which are shown in Figs. 6 and 7, but a casing 93 is shown as if it surrounded all those mechanisms.

From the description which has now been given it is believed that the general adaptability of my system to the teaching of a wide variety of flying maneuvers will be readily understood. The relatively simple operation of making a banked turn has been used in this description merely as an illustration. All other maneuvers which the student must learn are capable of treatment in the same manner as before described. For instance, it will be readily understood how the system is applicable to landing maneuvers. For that maneuver the camera will ordinarily be kept trained on some selected point on or in proximity to the landing field so that the student then has a relatively stationary reference point in the picture, with relation to which reference point the pictured plane performs the maneuver movements which are necessary to a proper landing.

For some particular purposes it may be desirable to operate the camera in a position stationary with relation to the original aircraft, to produce a picture in which the aircraft remains apparently stationary and the surrounding scene appears to move. For instance in teaching cross wind landings it may be desirable that the instructor allows his picture-taking plane to drift and to take the picture in the manner which will show the relative ground movement due to that drift in order to teach the student to recognize a condition which he must correct in order to make a proper landing. Similar observations apply to pictures which may be taken to illustrate side slips and skids.

I have mentioned various adjuncts which may be used in the system to heighten realism for the student. The sound effects may be independently produced or reproduced from the picture film by any suitable reproducing apparatus, which I do not illustrate in Figs. 4 and 5 as they are well known. Other physical effects may also be introduced; for instance the effects of air bumps and holes may be realistically produced by suitable apparatus. However I do not regard my invention to be limited either to the use or non-use of any such effects.

I claim:

The air pilot instruction method which includes the following steps: providing a maneuverable student's dummy aircraft which has portions constituting at least two reference points which are visually angularly spaced when viewed from the student's visual point in the dummy; and showing on a screen adjacent the dummy a motion picture which shows an aircraft moving through a maneuver with reference to a substantially stationary background, the pictured aircraft having reference points corresponding to those of the dummy, and the picture being shown at such visual angular size that the student may visually register the dummy reference points with the pictured reference points and thereby move the dummy through maneuver movements corresponding to the pictured maneuver movements of the aircraft, with the result that the student is given the impression of being located in the pictured aircraft and his reflex actions become similar to those of the pilot of that aircraft.

WILLIAM N. WHITE.